(12) United States Patent
Beckenbach

(10) Patent No.: US 10,532,684 B1
(45) Date of Patent: Jan. 14, 2020

(54) METHOD FOR DISPLAYING AN IMAGE OR SCENERY ON A FLOOR MAT OR FLOOR LINER

(71) Applicant: Martin J. Beckenbach, Palmyra, NY (US)

(72) Inventor: Martin J. Beckenbach, Palmyra, NY (US)

( * ) Notice: Subject to any disclaimer, the term of this patent is extended or adjusted under 35 U.S.C. 154(b) by 332 days.

(21) Appl. No.: 15/064,719

(22) Filed: Mar. 9, 2016

(51) Int. Cl.
| | |
|---|---|
| B44C 1/24 | (2006.01) |
| B60N 3/04 | (2006.01) |
| B41J 3/407 | (2006.01) |
| B44C 3/08 | (2006.01) |
| B32B 38/00 | (2006.01) |
| B32B 38/06 | (2006.01) |

(52) U.S. Cl.
CPC .............. B60N 3/048 (2013.01); B41J 3/407 (2013.01); B44C 3/085 (2013.01); *B32B 38/06* (2013.01); *B32B 38/145* (2013.01)

(58) Field of Classification Search
CPC ............ B32B 38/06; B44C 1/24; B44C 3/085
USPC ........................ 156/219, 277, 220
See application file for complete search history.

(56) References Cited

U.S. PATENT DOCUMENTS

| | | | | |
|---|---|---|---|---|
| 3,616,192 | A * | 10/1971 | Sinclair | B32B 27/00 428/13 |
| 3,794,550 | A * | 2/1974 | Tallie | B42C 9/0081 156/277 |
| 5,458,714 | A * | 10/1995 | Brandt | B44C 1/1712 156/237 |
| 5,804,285 | A * | 9/1998 | Kobayashi | B32B 3/30 428/172 |
| 7,947,138 | B2 * | 5/2011 | Endert | B44B 5/026 156/219 |
| 8,002,936 | B2 * | 8/2011 | Roof | B32B 38/145 156/273.7 |
| 2008/0073465 | A1 * | 3/2008 | Veihelmann | B29C 65/5057 244/133 |
| 2010/0015420 | A1 * | 1/2010 | Riebel | B32B 27/06 428/203 |

* cited by examiner

*Primary Examiner* — Scott W Dodds
(74) *Attorney, Agent, or Firm* — Bond, Schoeneck & King; Jonathan Gray; George McGuire

(57) ABSTRACT

A method for applying an image to a floor mat or floor liner including applying a layer of ink to a first side of a clear applique; bonding, with a bonding agent, the first side of the clear applique to a surface of a substrate; and heating the applique and substrate to a first temperature such that the adhesive cures; heating the bonded substrate to a second temperature, such that the surface of the substrate becomes malleable; and forming a scene into the surface of the substrate.

11 Claims, 6 Drawing Sheets

METHOD FOR DISPLAYING AN IMAGE OR SCENERY ON A FLOOR MAT OR FLOOR LINER

BACKGROUND OF THE INVENTION

1. Field of the Disclosure

The present invention relates to floor mats or floor liners and, more particularly, to floor mats or floor liners that depict an image.

2. Description of the Related Art

Rubber and plastic floor mats or floor liners have become a nearly ubiquitous automotive accessory and a multi-million dollar industry. The appearance of the mats, however, has remained stagnant—an unchanging slew of mats with little or no design beyond a generic pattern continue to flood the market. Indeed, there has been little progress in developing or changing the appearance of the mat. Accordingly, there exists a need in the art for a method for applying a unique image to a floor mat or floor liner, or forming a scene into the floor mat or floor liner in relief.

BRIEF SUMMARY OF THE INVENTION

Accordingly, various embodiments described herein are directed to a method of applying an image to a floor mat or floor liner. In some embodiments, the method may include the steps of applying a layer of ink to a first side of a clear applique; bonding, with a bonding agent, the first side of the clear applique to a surface of a substrate; and heating the applique and the substrate to a first temperature such that the adhesive cures.

In an embodiment, the method may further include the steps of heating the bonded substrate to a second temperature, such that the surface of the substrate becomes malleable; and forming a pattern into the surface of the substrate.

In another aspect, a method for forming a scene into a floor mat or floor liner comprises the steps of: receiving a digital image comprised of a plurality of pixels, each pixel having an initial pixel value and a relative position in the digital image; assigning either a first value or a second value to each pixel according to the initial pixel value of each pixel; creating a mold having a surface with a plurality of raised portions, wherein the relative shape, dimension, and position of each raised portion, with respect to each other raised portion, is defined by the relative position, within the digital image, of at least one pixel having the assigned first value.

In another aspect, a floor mat or floor liner depicting a scene may comprise a surface having a plurality of raised portions, wherein the relative shape, dimension, and position of each raised portion, with respect to each other raised portion, is defined by the position and value of at least one pixel within a digital image, such that the plurality of raised portions depict at least a portion the digital image in relief.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
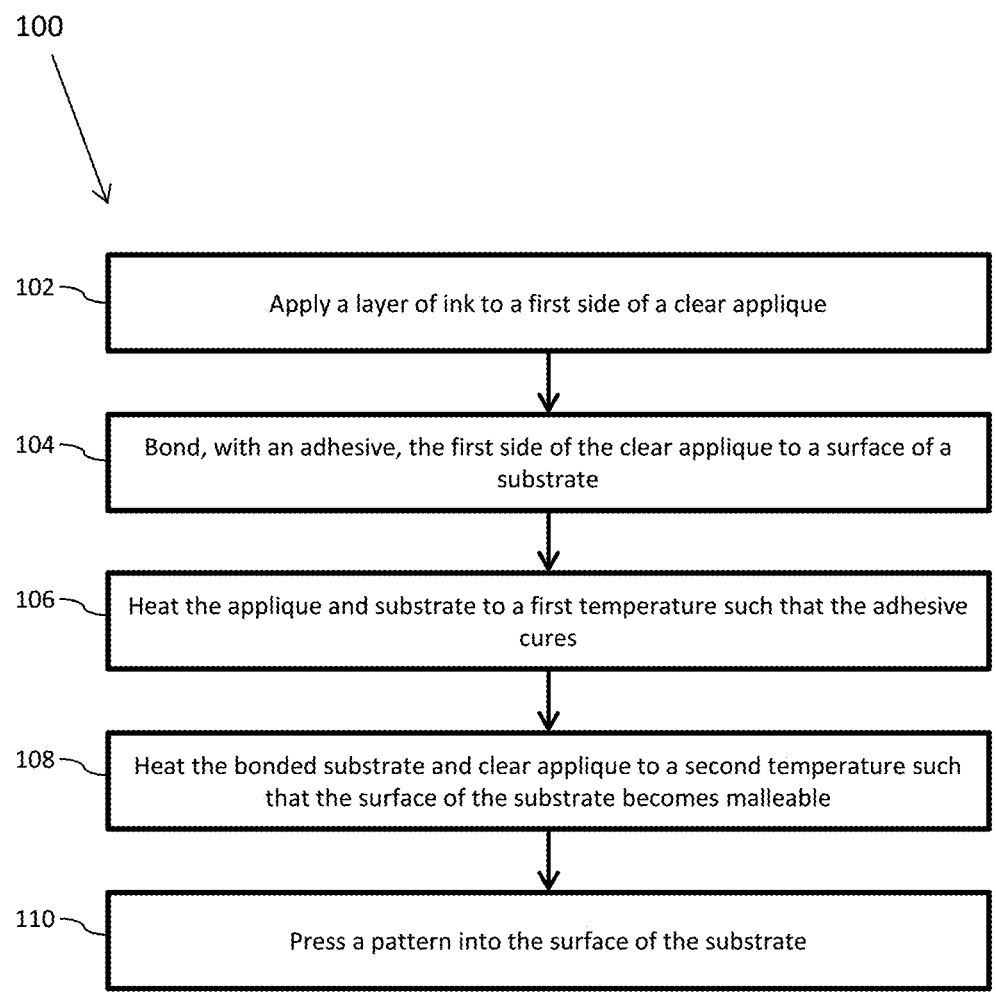
FIG. 1 is a flowchart of a method for applying an image to a floor mat or floor liner, according to an embodiment.
Figure 2:
FIG. 2 is a top view of a floor mat with a bonded image applique, according to an embodiment.

Referring now to the drawings wherein like reference numerals refer to like parts throughout, there is shown in FIG. 1 a flowchart of a method for applying an image to a floor mat or floor liner (as shown in FIG. 2), according to an embodiment. In step 102, a layer of ink (in an embodiment, depicting an image) is applied to a first side of a transparent applique. The applique may, in an embodiment, be a plastic, such as vinyl, or another material which may be transparent and receive a layer of ink. As will be appreciated in view of later steps, it may be desirable that the clear applique be able to retain the ink image, even after being heated to temperatures including 325° F., and be able to plastically retain different shapes upon heating, pressing, and cooling. The ink layer, in an embodiment, may be an acrylic ink; however, one of ordinary skill would appreciate (in conjunction with a review of this disclosure) that the ink may be a solvent-based ink, a waterborne ink, or any other ink suitable for coating a layer of plastic or other material as described above.

In step 104, in an embodiment, the first side of the clear applique may be bonded with a bonding agent to a surface of a substrate. In other words, the ink-side of the clear applique is bonded to the substrate. Thus, in appearance, the image formed in ink is visible through the transparent applique when the applique is bonded to the substrate. In an embodiment, the substrate may be made of a plastic, rubber, or other material as are known in the art for making durable floor mats or floor liners.

In an embodiment, the bonding agent may be an adhesive. The adhesive may be any adhesive suitable for attaching the clear applique to the substrate. More specifically, the adhesive may be a membrane press adhesive, such as a waterborne polyurethane adhesive. One of ordinary skill will also appreciate, in conjunction with a review of this disclosure, that other adhesives, such as solvent-based adhesives, may be used. In an embodiment, the adhesive may be combined with a catalyst to improve heat resistance and to strengthen the bond formed between the clear applique and the substrate. For example, a polyisocyanate, such as hexamethylene diisocyanate available from Daubert Chemical Company, Inc, may be used to strengthen the bond. Such a catalyst crosslinks with the adhesive to improve heat resistance and the adhesive qualities. Furthermore, the combination of the adhesive and the catalyst may permeate the ink, (i.e. solvent-based ink or water-based ink) and improve the adhesive qualities of the bond with the ink.

In an alternate embodiment, the bonding agent may be an ink composition, such that the adhesive described above is not required. For example, an embodiment of the present invention recognizes that PVCs and other plastics will bond to themselves or to similar materials when heated and mated. Thus if the ink is plastic-based (or otherwise combined with a plastic) such as a PVC-based ink composition, the ink composition itself may serve as a bonding agent. In other words, such an ink composition may be applied between the applique and the substrate and, when heated, bond the substrate to the applique because the applique, ink, and substrate can all be made of a plastic material, such as PVC. More generally, any ink composition which can bond two materials together when heated may be used.

In step 106, in an embodiment, heat is applied to the bond in order to cure the adhesive (or adhesive catalyst mixture). In an embodiment, the heat may be anywhere up to 170° F. In another embodiment, the heat may be between 120° F. and 170° F. In alternate embodiments, and for alternate adhesives, the temperature required to cure the adhesive may exceed 170° F. (for example, reaching 325° F.) or fall below 120° F., as will be appreciated (in conjunction with a review of this disclosure) by a person of ordinary skill in the art.

In step 108, in an embodiment, the substrate is heated to a second temperature such that the surface of the substrate is malleable. In an embodiment, the second temperature may be up to 325° F. In an alternate embodiment, the temperature may be between 400° and 325° F. One of ordinary skill in the art will appreciate (in conjunction with a review of this disclosure) that the temperature may be any suitable temperature to mold the surface of the substrate—thus this temperature may vary depending on the material of the substrate.

Figure 3:
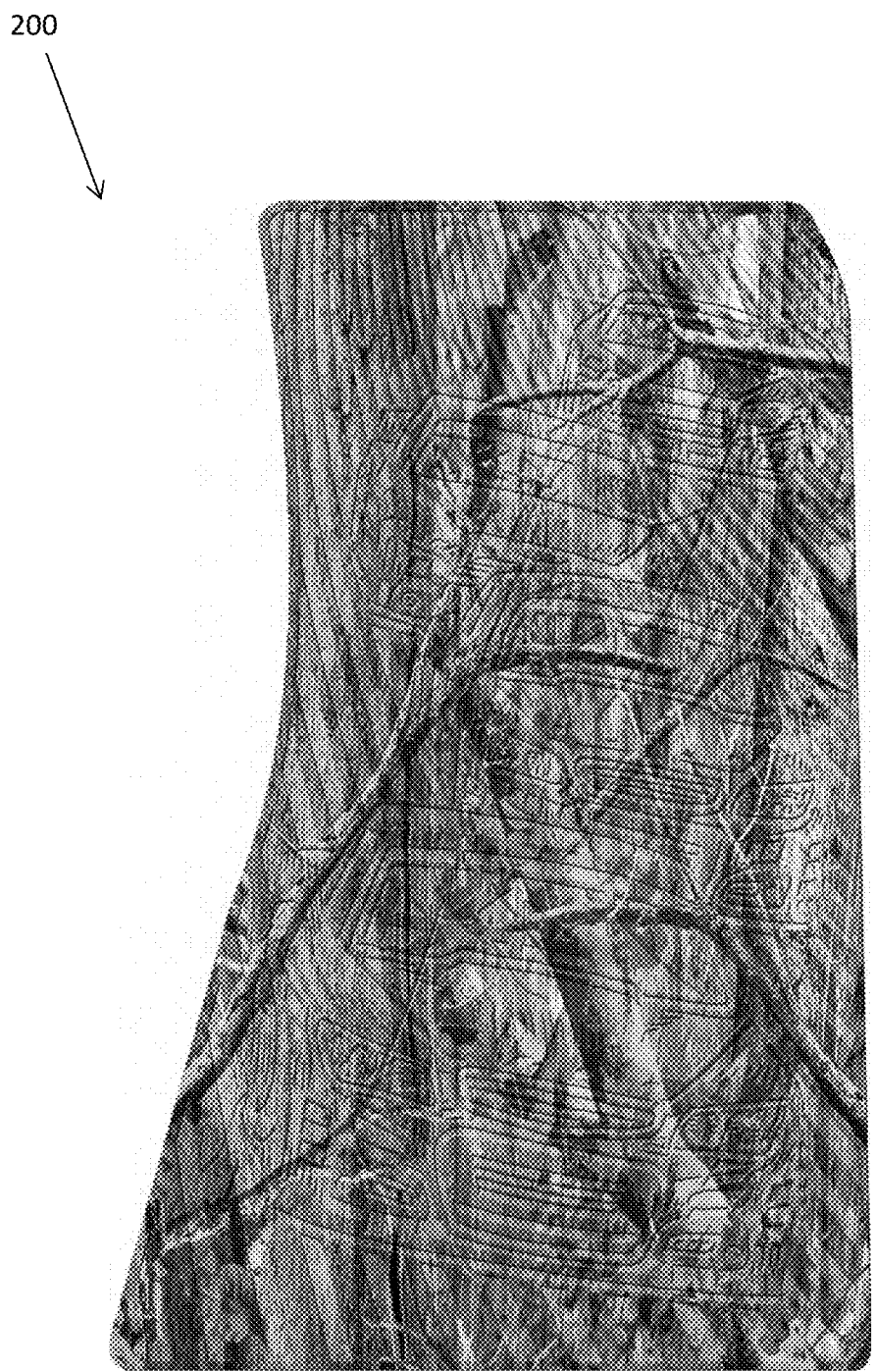
FIG. 3 is a top view of a floor mat with a bonded image applique and a formed scene, according to an embodiment.

In step 110, in an embodiment, once heated, a pattern may be formed into the substrate by pressing or other techniques as are known in the art. In alternate embodiments, other methods for forming the pattern, such as injection molding, may be used. As shown in FIG. 3, the pattern may be a scene as described in conjunction with FIGS. 4-6, below.

As shown in FIGS. 2 and 3, the resulting floor mat is a substrate bonded to a clear applique—the clear applique having an image printed with an ink on the side that is bonded to the substrate, such that the image is viewable on the opposite side of applique. A scene as shown in FIG. 3, or pattern, may be formed into the substrate and applique.

Figure 4:
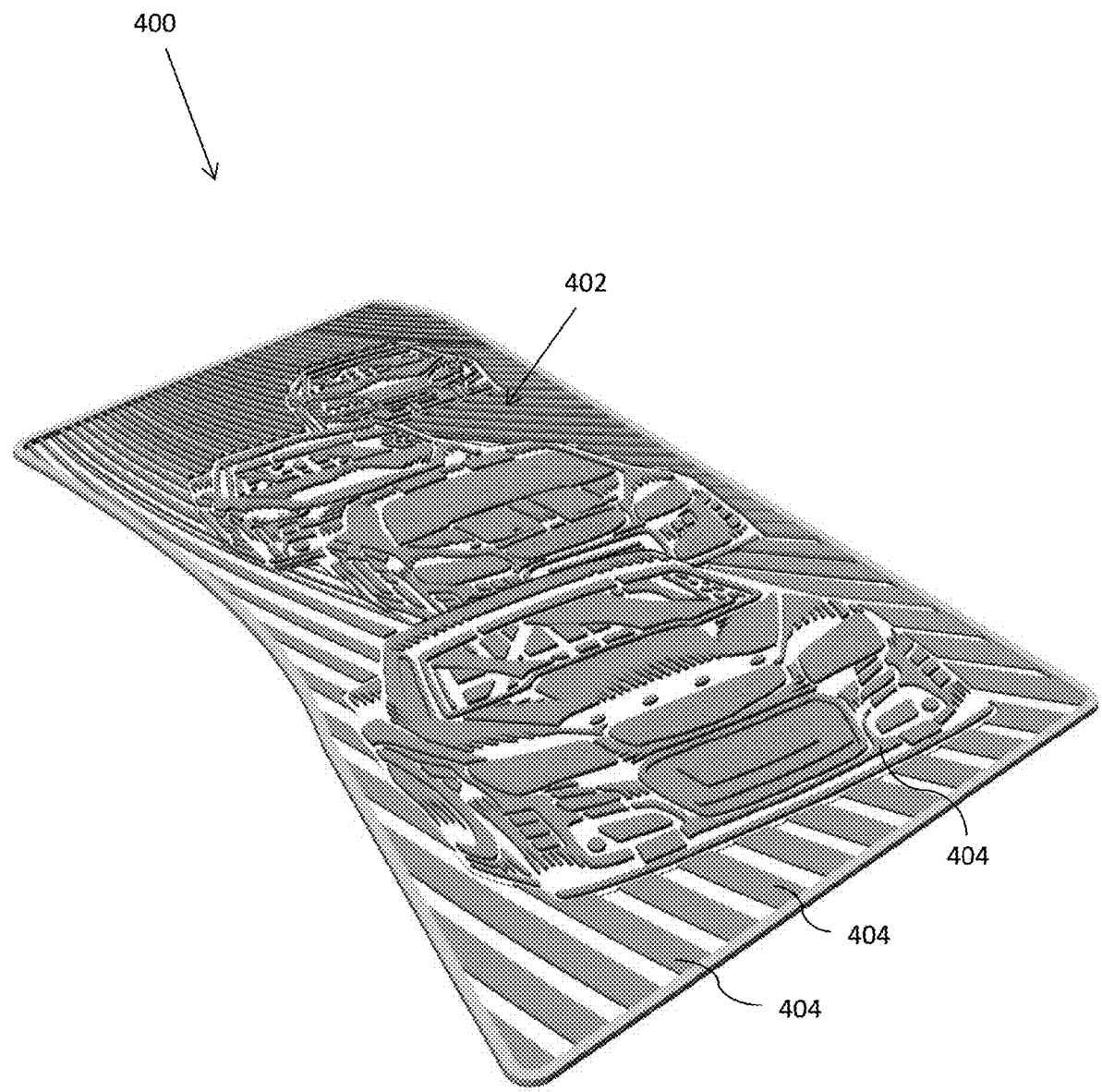
FIG. 4 is a perspective view of floor mat depicting a scene in relief, according to an embodiment.
Figure 5:
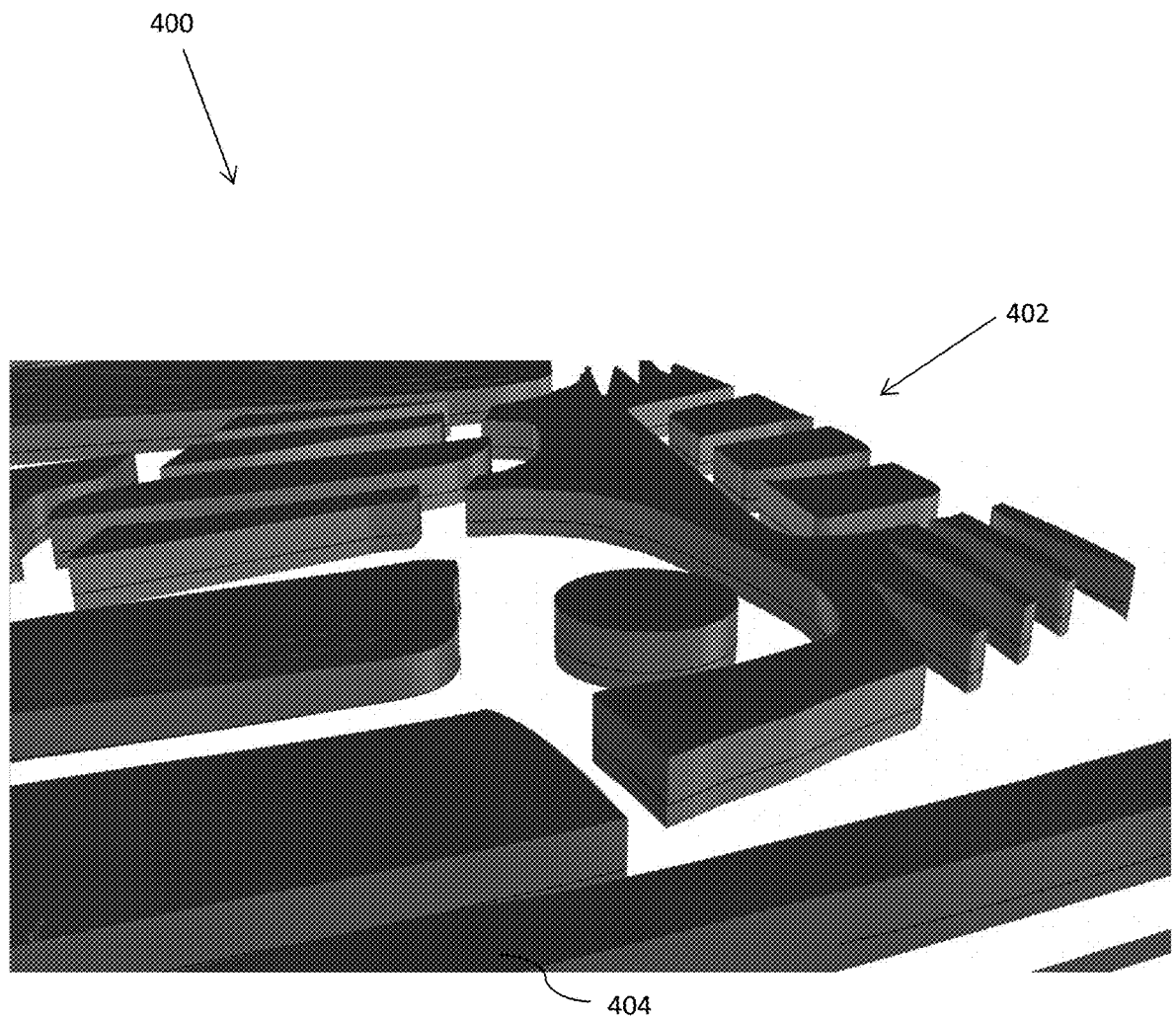
FIG. 5 is a perspective view of a close up of the raised portions of a floor mat depicting a scene in relief, according to an embodiment.

Turning now to FIG. 4, there is shown a floor mat 400 depicting a scene. (In an alternate embodiment, the floor mat 400 may be a floor liner.) The floor mat 400 may have at least one surface 402, having a plurality of raised portions 204. A close-up, three-dimensional view of the raised portions 204 and surface 402 may be scene in FIG. 5. The scene displayed by the floor mat 400 (or floor liner) may correspond to digital image depicting the same or a similar scene. For example, the scene depicted in FIG. 4 of a several race cars may correspond to a digital image similarly depicting the race cars. Thus, the relative shape, dimension, and position of each raised portion 204, with respect to each other raised portion, may defined by the position and value of at least one pixel within a digital image, such that the plurality of raised portions 204 depict at least a portion the digital image in relief. For example, the raised portions 204 that depict the grill of one race car may correspond to a plurality of pixels of a digital image that depict the grill of the same race car. Thus, the shape, dimension, and position of the raised portion(s) 204 that depict the grill of the race car, with respect to the remaining raised portions 204 defining the scene, is/are defined by the position of the pixels, within the digital image, that define the grill of the race car.

Figure 6:
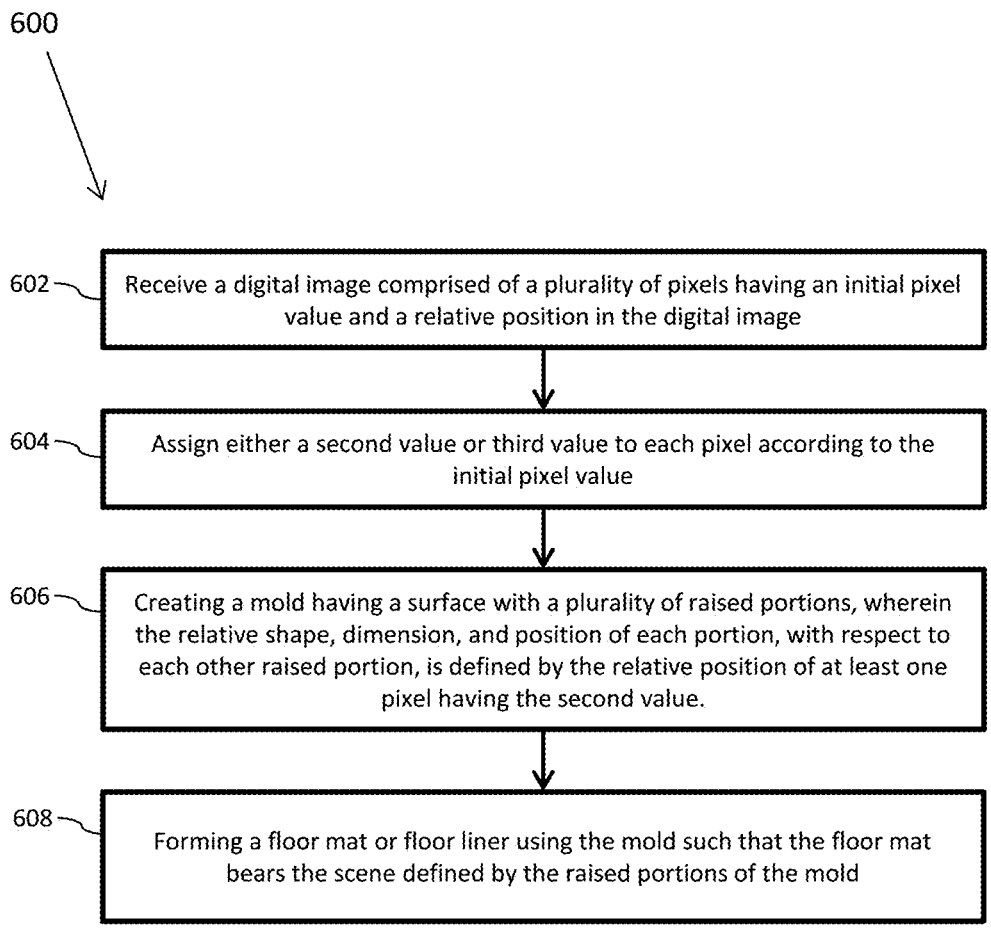
FIG. 6 is a flowchart of a method for forming a scene into a floor mat or floor liner, according to an embodiment.

Turning now to FIG. 6 there is shown a method for forming a scene into a floor mat 400 or floor liner in relief.

In step 602, an image is received. The image (with at least respect to the process described in conjunction with FIG. 6) may be drawn or otherwise created by an artist, such as with drawing software, or captured with film or digital photography. The image may depict a scene, such as a race car scene as shown in FIG. 4.

The image may be received as a digital file, or converted into a digital file. The digital file may be comprised of a plurality of pixels, each pixel having an initial pixel value and a relative position in the digital image. For example, the digital file may be an array of values, each value corresponding to a color or lightness or darkness of a pixel, and the location of the pixel with respect to the other pixels, when image is displayed. One of ordinary skill will appreciate (in conjunction with a review of this disclosure) that there are a myriad of ways of storing such data, and that any file format may be used that conveys the value of a pixel and its location within the image.

In step 604, a first value or second value may be assigned to each pixel according to the initial pixel value. In this way, each pixel may be organized into a first category or a second category according to the value of the pixel. For example, if the value of the pixel is above a predetermined lightness threshold, the pixel may be assigned the first value (i.e. organized into a first category). Whereas if the value of the pixel is below the predetermined lightness threshold, the pixel may be assigned the second value (i.e. organized into the second category). Thus if the pixel represents a dark gray, the pixel may be assigned the second value. Alternately, if the ratio of color represented by the pixel (i.e. the ratio of cyan, magenta, and yellow) is light, it may be assigned the first value. Thus a light red (such as a bright pink) may be assigned the first value, whereas a dark red (such as a deep burgundy) may be assigned the second value. Of course, one of ordinary skill will appreciate (in conjunction with a review of this disclosure) the threshold may be varied such that most shades of colors will fall into the first category or the second category. In an alternate embodiment, the pixels may be organized according to other values, such as color, saturation, etc. One of ordinary skill will also appreciate (in conjunction with a review of this disclosure) that the first value may be assigned to the pixels value below a threshold (instead of above). Which category a particular pixel falls may be varied considering the image received and the desired appearance of the final mat.

Furthermore, in an embodiment, the pixels may be assigned their value according to the value of adjacent pixels. For example, if a pixel is a light value (and would be assigned the first value) but all neighboring pixels are a dark value, the pixel may be assigned the second value. Thus, the first or second value may be assigned to each pixel within a region according to an average value or dominant value of the pixels within the particular region. In alternate or additional embodiments, if a group of pixels of one value does not exceed a particular number (with respect to the value of the surrounding pixels) or if the group of pixels does not exceed a particular number in a particular dimension, the pixels may be assigned the value of the surrounding pixels. For example, if, in the middle of a large group pixels having the first value, there exists a group of two pixels of the second value, the pixels may be assigned the second value because the group is not large enough. Also, if, in the middle of group of pixels having the second value, there exists a line of pixels of the first value, only one pixel wide, the pixels may again be assigned the second value because there are not enough pixels in a particular dimension. In this way, small groups of pixels having one value may be removed in favor of larger groups of pixels. This may serve to make the resulting categorization more uniform.

In step 606, a mold may be created having a plurality of raised portions 204. The mold may be created through machining, pouring, etching, or additive manufacturing such as 3D printing. One of ordinary skill appreciate (in conjunction with a review of this disclosure) that a mold may be a dye, form, tool, or any other suitable means for forming a floor mat as described in this disclosure, as is known in the art. In an embodiment, the relative shape, dimension, and position of each raised portion, with respect to each other raised portion, is defined according to the relative position of at least one pixel having the second value. Thus, the resulting mold may have at least one raised portion or portions that convey the image depicted in the original image. In other words, the floor mat 400 or floor liner may depict, in relief (via the raised portions 204), a version of the image depicted in the image received in step 602. Of course, because the pixels have been grouped into at least two categories, the image depicted in relief may be a simplified version of the image received in step 602.

In order to depict the image, the raised portions 204 may map to the pixels of a particular value (i.e. the first or second value). Thus, for example, if the pixels having the first assigned value are grouped into two regions—the regions accordingly having a shape and dimension and position within the image—the raised portions 204 may, proportionally, have the same or a similar shape and dimension relative to the floor mat 400 or floor liner. In this way, the raised portions 204, when viewed against the non-raised portions of the mat 400, may depict the image in relief.

This may be accomplished in one of several ways. For example, the floor mat 400 or floor liner may be divided into a grid (or other coordinate system) wherein each point on the grid may correspond to a pixel or a group of pixels in a particular location on the image. Thus, if the pixel or pixels on that point in the image have the first value (or, alternately, the second value), that grid-point would be raised (or alternately, lowered). This may be accomplished with an etching, 3D printing, or machining device as are known in the art. For example, a CNC device—in an embodiment equipped with an interface for converting the data received from a computer to signals directing the movement of the CNC device—may be employed to machine the lower the portions and form the raised portions 204 of the floor mat 400 or floor liner.

In step 608, the mold created in step 606 may be used to create a floor mat 400 or floor liner. The floor mat 400 or floor liner may be created from a substrate as are known in the art.

In an alternate embodiment, it will be appreciated (in conjunction with a review of this disclosure) that the mold created in step 204 may be a master that would be used to create other molds. To accomplish this, the pixel value that the raised portions 204 are keyed to may be reversed. Thus, if the raised portions 204 are keyed to the pixels having the first assigned value to make a mold, they may instead be keyed to the pixels having the second assigned value. Alternately, what values form the first and second values may be reversed, so that the light values are assigned the second value instead of the first.

In an embodiment, the above steps may be automated and completed by a processor programmed to perform the steps as an algorithm. Thus, in an embodiment, a nontransitory storage medium, together with a mold-machining device (or other mold-making device) may be programmed with an algorithm to perform the steps of: receiving a digital image comprised of a plurality of pixels, each pixel having an initial pixel value and a relative position in the digital image; assigning either a first value or a second value to each pixel according to the initial pixel value of each pixel; and creating a mold having a surface 402 with a plurality of raised portions 204, wherein the relative shape, dimension, and position of each raised portion, with respect to each other raised portion, is defined by the relative position, within the digital image, of at least one pixel having the assigned first value.

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for applying an image to a floor mat or floor liner, comprising the steps of:
   applying a layer of an ink composition to a first side of a clear applique;
   bonding with a bonding agent the first side of the clear applique to a surface of a substrate; and
   heating the bonded substrate to a first temperature, such that the surface of the substrate and the first side of the clear applique and a second side of the clear applique become malleable; and
   molding an image into the first side of the clear applique and the second side of the clear applique and the surface of the substrate such that the thickness of the substrate varies to depict the image in relief.

2. The method of claim 1, wherein the bonding agent is an adhesive.

3. The method of claim 2, wherein the first side of the clear applique is bonded to the surface of the substrate with the adhesive and a catalyst.

4. The method of claim 3, wherein the catalyst is a polyisocyanate.

5. The method of claim 2, wherein the adhesive is a urethane adhesive.

6. The method of claim 1, wherein the bonding agent is the ink composition.

7. The method of claim 1, wherein the applique is a plastic.

8. The method of claim 7, wherein the plastic is vinyl.

9. The method of claim 8, wherein the adhesive is waterborne.

10. The method of claim 1, wherein the ink is an acrylic ink.

11. The method of claim 1, wherein the first temperature is up to 325° F.

* * * * *